United States Patent Office 2,977,105
Patented Mar. 28, 1961

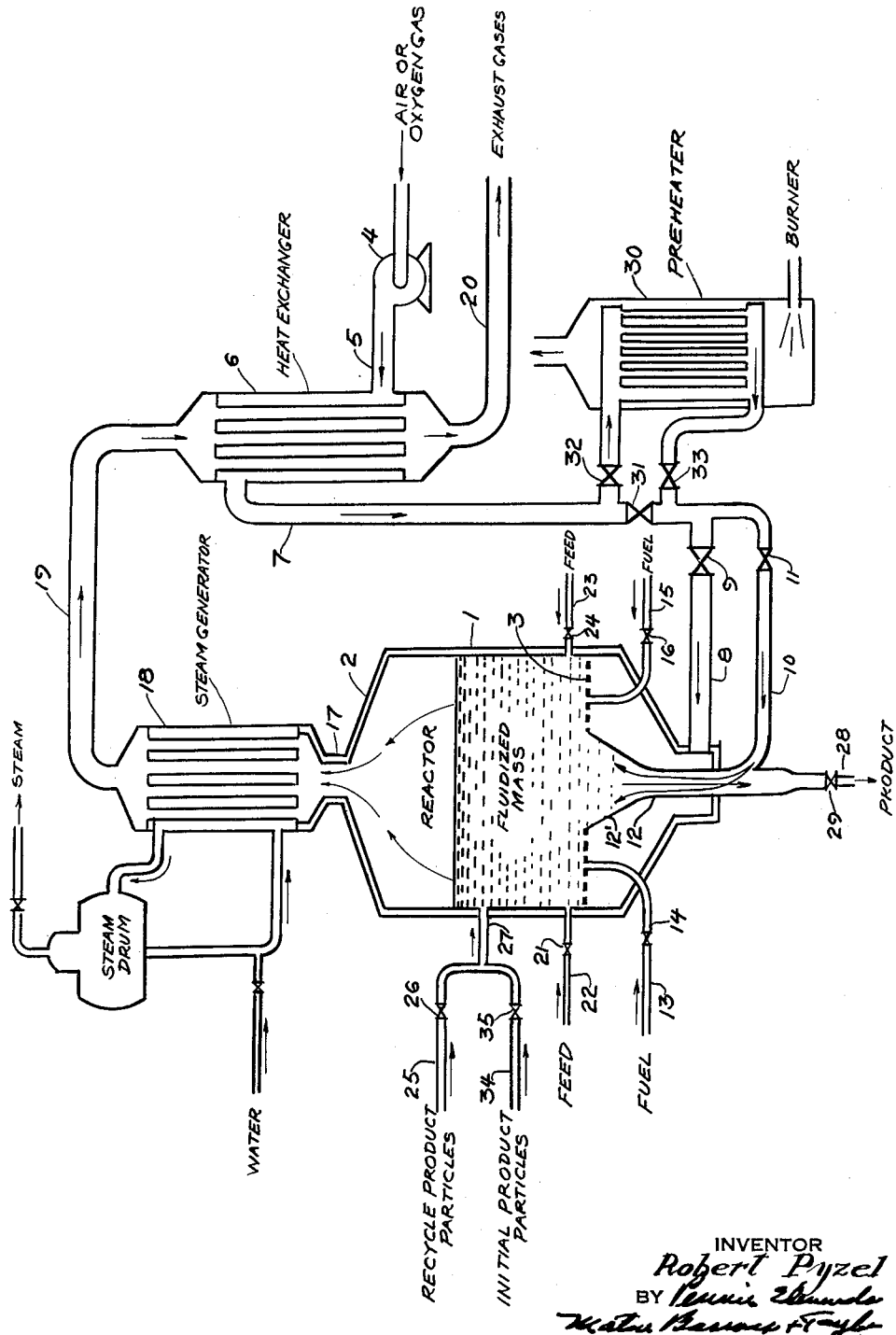

2,977,105

APPARATUS FOR CEMENT MANUFACTURE

Robert Pyzel, New York, N.Y., assignor to Pyzel-Fitzpatrick, Incorporated, New York, N.Y., a corporation of Delaware Original application Mar. 16, 1954, Ser. No. 416,603, now Patent No. 2,874,950, dated Feb. 24, 1959. Divided and this application June 6, 1958, Ser. No. 740,407

3 Claims. (Cl. 263—21)

This invention relates to the art of manufacturing hydraulic cements, and particularly to an apparatus for the economical manufacture of such cements in accordance with the method disclosed and claimed in my copending application Serial No. 416,603, filed March 16, 1954, now Patent No. 2,874,950, of which this application is a division. Said copending application was filed as a continuation-in-part of my still earlier application Serial No. 264,144, filed December 29, 1951, now abandoned.

Hydraulic cements may be manufactured from raw materials containing carbonates and/or sulphates, such as calcium carbonate and calcium sulphate, and compounds of silica, alumina, iron oxide, and the like. To convert these materials into hydraulic cement requires that the calcium compounds be converted to calcium oxide by removal of carbon dioxide and/or sulphur dioxide and oxygen, and that the calcium oxide is reacted with the silica, alumina and iron oxide materials to form compounds consisting of combinations such as di-calcium-silicate, tri-calcium-silicate, tri-calcium-aluminate and tetra-calcium-alumino-ferrite.

One of the features of my invention is the provision of an apparatus in which the cement-forming reactions may take place in a mass of fluidized solid particles which is maintained in a reaction zone at temperatures in excess of 2000° F. and in which a controlled and limited amount of reaction occurs relative to the total mass of fluidized material.

Another feature of my invention is the provision of an apparatus in which the cement-forming reactions may be carried out in such a manner that the formation of "clinkers" or large aggregates of reactants materials is avoided, while the reaction materials are nevertheless permitted to "flux" in order to form the desired cement product.

Another feature of my invention is the provision of an apparatus in which the cement-forming reactions may be carried out at much longer reaction time factors than those possible in the kilns now used in the cement industry.

Another feature of my invention is the provision of an apparatus in which the cement-forming reactions may be carried out at more uniform and, if desired, higher reaction temperatures than those attainable in the kilns now used in the cement industry.

A further feature of my invention is the provision of an apparatus in which the larger particles, as they are formed in the mass of fluidized particles, may be selectively withdrawn from the fluidized mass. This is accomplished, in the preferred form of the invention, by providing a discharge tube extending downwardly from the reaction space for the discharge of the reaction product, and the provision of means whereby a gas, preferably air, may be passed upwardly through the discharge tube, countercurrent to the downwardly-flowing reaction product, in such volume and under such velocity as to entrain the smaller and lighter products and carry them back into the fluidized bed, or prevent them from ever leaving the fluidized bed, so that only the larger and heavier particles which are not entrained by the upward flowing stream of gas are discharged from the reaction space.

A still further feature of my invention is the provision of means whereby a portion of the gas necessary for the fluidization of the reaction mass may be introduced into it through a gas-permeable bottom of the reaction vessel, while the remainder of the gas necessary for its fluidization may be supplied through the downwardly-extending discharge tube, together with means for correlating the relative amounts of gas introduced through the gas-permeable bottom of the reaction vessel and the discharge tube that a substantially constant amount of gas is introduced into the reaction mass.

The combination of these features in the apparatus of the invention makes it possible to manufacture cements more economically and of more uniform and better quality, and it provides the means for manufacturing cements of modified or different chemical composition compared to those which can now be produced commercially, and which may have superior or special qualities desirable in various types of construction employing cement.

My invention provides an apparatus in which the finely ground feed materials, consisting, for instance, of carbonates or sulphates and oxide materials, may be charged into the reaction zone as such, or after they have been subjected to pre-treatment to partially or completely convert the carbonates or sulphates in the feed to the corresponding oxides.

The reaction vessel of my apparatus is adapted to contain a mass of solid particles maintained in a fluidized state by upward flow of air or other oxygen carrying gases through the mass. The mass is heated to and maintained at reaction temperatures by injection of fuel into the mass which, by combustion with the oxygen of the fluidizing gases (and the oxygen released by conversion of sulphates, if the latter are present in the feed materials), generates the necessary heat.

In the production of cement in the apparatus of my invention, the particles contained in the fluidized mass consist almost entirely of cement product material with only a limited amount of reaction of cement-forming materials taking place in the fluidized mass, mostly on the surfaces of said cement product particles. The mode of operation of this fluidized mass and the purpose of this operation are fully described in my foresaid application, Serial No. 416,603.

The present invention will be further described with reference to the accompanying drawing which diagrammatically illustrates a preferred form of my apparatus.

Referring to the drawing, the fluidized mass 1 is maintained in reactor 2 and supported on a suitable grid 3. Reactor 2 may consist of a steel shell internally lined with firebrick and externally insulated. Air or other oxygen containing gases are charged into the fluidized mass by means of compressor 4, the gases flowing from compressor 4 through line 5, then through heat exchanger 6, then through line 7 which divides into lines 8 and 10 which are provided respectively with flow control valves 9 and 11. The gases flowing through line 8 enter the lower portion of the reactor, beneath the grid 3 and pass upwardly into the fluidized mass, while those flowing through line 10 enter the fluidized mass through a product discharge tube 12. The upper end of the discharge tube 12' is of conical form for reasons hereinafter set forth. Suitable quantities of fuel (gas, oil, powdered coal, or the like) are charged into the fluidized mass through lines 13 and 15, provided respectively with control valves 14 and 16. Combustion of the fuel with the oxygen of the gases entering through lines 8 and 10, and the oxygen which may be generated within the fluidized mass by conversion of sulphates, provides the heat necessary to maintain the fluidized mass at operating temperatures. The combustion and other gases discharging from the top of the fluidized mass flow through a discharge outlet 17, through steam generator 18, through line 19, through heat exchanger 6, and are discharged from the apparatus through line 20.

The feed materials, ground to a fine powder in equipment not shown, are charged into the fluidized mass through lines 22 and 23 provided with control valves 21 and 24. Recycled product particles for controlling the particle size distribution of the fluidized mass may be charged through line 25, with control valve 26, and line 27.

Product particles are withdrawn from the fluidized mass through the product discharge tube 12 and are discharged from the apparatus through line 28 and valve 29. The product discharge tube 12 operates in the following manner. The gases charged into the tube 12 from line 10 flow upward therethrough, and as they pass upwardly through the conical portion 12' of increasing diameter, their linear velocity is decreased. The fluidized mass immediately above the conical portion 12' will descend into the discharge tube to the section where the gas velocity is sufficient to generally support only the smaller fluidized particles. In this section a segregation will occur, the larger particles continuing on downward since their ratio of mass to superficial surface is high enough so that these larger particles will fall against the rising gas current, while the smaller particles are borne upwardly by this current and are returned into the fluidized mass. Operating control over the degree and extent of particle separation with any given design of discharge tube may be obtained by varying the gas velocities in the tube by adjustment of the division of the total gas flow between lines 10 and 8. Thus, more gases or less gases may be made to flow upward through the product discharge tube 12 by causing a corresponding lesser or greater flow of gases through the grid 3, the adjustment being obtained by means of valves 9 and 11. The larger particles, which were able to fall against the rising gas stream, collect in the bottom extension of the tube below the gas inlet, from which they may be discharged through line 28 as before mentioned.

The apparatus is placed in operation by charging the air or oxygen carrying gas stream flowing through line 7 through auxiliary gas preheater 30 by closing valve 31 and opening valves 32 and 33. The division of the gas stream between lines 8 and 10 is adjusted to a high flow through line 10. The auxiliary gas preheater 30 is fired. Product particles of a size range corresponding to the average particle size distribution of the fluidized mass during normal operation are then charged into reactor 2 through line 34, valve 35, and line 27, until the desired level of this initial fluidized mass of product particles is obtained. The temperature of this fluidized mass will rise as the preheated gases flow through it, and when the temperature is sufficiently high, for instance in the order of 1000° F., fuel is charged into the fluidized mass which, by combustion with the oxygen in the gases, will raise the temperature to the desired operating level. The auxiliary preheater is then cut out and valve 31 opened while valves 32 and 33 are closed. Charging of feed powder is now started. Product withdrawal is started by adjusting the gas flow rates through lines 8 and 10, as above described. When necessary, recycle product particles are charged, as above described. The operation may be lined out at the desired operating conditions, and the process is on stream.

In the production of cement in the present apparatus, it is necessary to control the molten phase which develops during the course of the cement-forming reactions. This molten phase has heretofore been the principal obstacle to successfully carrying out the cement-forming reactions in a fluidized solids operation, for it causes a "stickiness" which agglomerates the fluidized solid particles into large aggregates and thereby renders the continued operation of the fluidized mass impossible—the fluidized mass rapidly became a stationary body of agglomerated particles.

This molten phase (which is characteristic of the cement-forming reactions, and which is helpful in promoting the progress of these reactions) is caused only by certain intermediate reaction materials, that is, neither the feed materials nor the final cement product can melt at the cement-forming reaction temperatures.

The molten phase serves its useful purpose while at the same time it is held in check to the point where agglomeration of the fluidized mass is prevented. This is accomplished by establishing at the start of the operation, and maintaining during continued operation, a fluidized mass consisting predominantly of relatively coarse particles of cement product material, for instance of a size ranging from 400 microns upwardly, and charging into this "stable" mass the feed materials in finely powdered form, for instance fine enough so that the maximum size is less than 100 microns. Initially, reaction sets in as some of the fine feed particles cling to the surfaces of the product particles and a small amount of molten phase develops on these surfaces causing a degree of "stickiness" which thereafter is sufficient to cause all the fine feed particles to be attached to the surfaces of the larger product particles. Thereby, the cement-forming reactions are caused to proceed on these surfaces, causing a gradual growing of the product particles as layer upon layer of new product material is created in this manner. But the amount of reaction taking place on the product particles is limited and controlled, in the manner described below, and hence the amount of molten phase occurring on these surfaces is also limited and controlled. The net effect is that there is sufficient "stickiness" to cause adherence of the fine feed particles to the coarser product particles, but yet the degree of "stickiness" is not sufficient to cause the larger product particles themselves to become attached to one another, and agglomeration of the fluidized mass is thereby prevented.

To obtain and control the desired degree of "stickiness" in the fluidized mass, it is necessary to select the proper charging rate of finely-powdered feed materials relative to the total mass of coarse fluidized product particles maintained in the reaction zone, and this selection of charging rate must be made in relation to the reaction velocities which, in turn, are primarily determined by the temperature level at which the fluidized mass is operated.

In the operation of the reaction zone disclosed herein, the smaller the feed rate relative to the total fluidized mass, the smaller will the amount of reacting materials dispersed over the surfaces of the product particles in the fluidized mass, and therefore the smaller will be the concentration of molten phase, and hence the "stickiness," which develops on these surfaces. But in addition to this, the concentration of the molten phase on the surfaces of the product particles in the fluidized mass will also be influenced by the operating temperature, the effect being that the higher the temperature the smaller the concentration of molten phase. This may appear contradictory since higher temperatures are usually associated with more melting. In the case of the cement-forming reactions, however, the molten phase is not a direct function of the temperature, but is due to the formation of eutectic mixtures, and these melt at any temperature within the range of temperatures in which the cement-forming reactions take place. It is therefore the relative amount of eutectic mixtures, not the reaction temperature as such, which determines the concentration of molten phase. These eutectic mixtures are formed only by certain intermediate reaction materials, and one may therefore look upon the cement-forming reaction as taking place in two steps—(1) reactions of feed materials into intermediate materials, with some of the latter forming eutectic mixtures which melt, and (2) reactions of intermediate materials into final product, with a disappearance of the molten phase because the eutectic forming intermediate materials are converted into "stable" final product. The concentration of eutectic forming intermediate materials in the system of reactions will depend on the relative velocities of the reactions involved in the first step and those involved in the second step. The reactions making up the second step are the more difficult and require higher temperatures to initiate. If the reaction temperature is not high enough, it is even possible that the first step will take place while the second step does not, with reaction proceeding only to the formation of intermediate materials, and hence a maximum opportunity for the formation of eutectics which will melt even at this lower reaction temperature. Raising the reaction temperature will bring the reactions of the second step into play causing conversion of the intermediate materials into final product, and thereby causing a decrease in the concentration of the intermediate, eutectic forming materials. Thus, the more the reactions velocities of the second step are speeded up relative to the velocities of the reactions of the first step, the lower the amount of intermediate materials, which in turn lowers the amount of eutectics with a resulting lower concentration of molten phase.

Furthermore, as the reaction temperatures are raised, all the reaction velocities are speeded up generally, so that at higher temperatures the over-all conversion of feed materials into final product will be more rapid. Consequently, for any given feed rate (relative to the mass of material in the reactor) the amount of reacting material present in the total fluidized mass will be reduced with increasing operating temperatures, and consequently the amount of molten phase will also be reduced, for this reason as well as, and in addition to, the reason referred to in the preceding paragraph.

The above factors are interrelated, and in the operation of the reaction zone disclosed herein, low feed rates relative to total fluidized mass plus high temperatures lead to low concentration of molten material and hence a low degree of "stickiness," while high feed rates and lower temperatures lead to higher concentration of the molten phase, hence to greater "stickiness." Thus the desired degree of "stickiness" may be obtained and controlled by the proper selection of operating temperature and feed rate in relation to total mass in the reaction zone.

In the operation of the reaction zone of the apparatus disclosed herein, the particles in the fluidized mass will continually grow in size as layer upon layer of new product material is created on the surfaces of the particles, and as a consequence the largest particles (which will have the greatest mass relative to surface) will contain the highest percentage of finished product material, with possibly only a trace of partially reacted material on their surface. It is therefore desirable to withdraw from the fluidized mass, through the discharge tube 12, only the largest particles to be discharged as final product of the operation, since in this manner the final product will contain the minimum, if any, unreacted or partially reacted material.

Since in the operation of the reaction zone in the apparatus disclosed herein, the particles in the fluidized mass will continually grow in size, there is a tendency toward increasingly coarser particle sizes in the fluidized mass as the operation of the process continues. Even when only the coarsest particles are selectively withdrawn as final product, there will nevertheless be a disappearance of the relatively smaller particle sizes. Therefore, in order to control and maintain the most satisfactory particle size distribution in the fluidized mass during continued operation, it is desirable to charge into the mass, in addition to the finely-powdered feed materials, controlled quantities of product material of somewhat smaller particle size, than the average particle size of the fluidized mass. These smaller product particles serve as nuclei for growing into larger particles, and by this procedure the particle size distribution of the fluidized mass is maintained as desired.

It sometimes happens that the cement-forming feed materials contain alkali materials. In the conversion of such materials into cement, the alkali materials are converted to sodium and potassium oxide in the reaction zone, and these oxides will be vaporized at the operating temperatures. Such oxide vapors are discharged from the fluidized mass and leave the reaction zone in the combustion and other gases. In the present apparatus these gases are discharged without being brought into contact with the feed materials (such as might be done in order to exchange heat from these gases to the feed materials) in order to avoid condensation of the alkali oxides in the feed materials. Therefore, a build-up of alkali concentration in the cement-forming reaction zone, such as occurs for instance in the kilns now used in the industry, is prevented. The use of the present apparatus assures that the concentration of alkali vapors in the fluidized mass is held to the minimum possible depending on the alkali content of the original feed materials, and as a consequence the cement product produced in this manner contains only a trace of alkalies, if any.

Various changes may be made in the form of the apparatus diagrammatically disclosed herein without departing from the invention or sacrificing any of the advantages thereof.

I claim:

1. Apparatus for carrying out reactions in a fluidized bed comprising a reaction vessel having a space for the carrying out of reactions, the bottom of said reaction space being defined in part by an annular gas-permeable member having its outer periphery adjacent the walls of the vessel, a discharge tube extending downwardly from the reaction space for the discharge of the reaction product, the upper portion of said discharge tube being connected to the annular gas-permeable member adjacent its inner periphery, the upper portion of said discharge tube converging downwardly to a tube section of smaller diameter, a plenum chamber directly beneath said gas-permeable member and surrounding the upper portion of the discharge tube, means for introducing pulverulent material to be reacted into the reaction space of said vessel, a heat exchanger, a conduit connecting the upper portion of the reaction chamber with said heat exchanger for the passage of hot gases from said reaction vessel to said heat exchanger, means for passing an oxygen-containing gas through said heat exchanger in indirect heat exchange with the hot gases passing through the heat exchanger from the reaction vessel, conduit means for conducting preheated oxygen-containing gas from said heat exchanger, a pair of branch pipes communicating with said conduit means at one end, one of said branch pipes communicating at its other end with said plenum chamber, the other of said branch pipes communicating at its other end with said discharge conduit, whereby preheated oxygen-containing gas may be introduced into said reaction space through both said discharge tube and from said plenum chamber, and means for introducing fuel into the reaction space of said vessel for combustion with the oxygen of the preheated oxygen-containing gas introduced into said reaction space.

2. Apparatus as set forth in claim 1 which includes valves in each of said branch pipes, whereby the relative amounts of oxygen-containing gas introduced into said reaction space through said discharge tube and from said plenum chamber may be controlled.

3. Apparatus as set forth in claim 2 which includes conduit means for recycling to said reaction space particles discharged from said space through the discharge tube.

References Cited in the file of this patent
UNITED STATES PATENTS

| | | |
|---|---|---|
| 2,498,710 | Roetheli | Feb. 28, 1950 |
| 2,607,576 | Harter | Aug. 19, 1952 |
| 2,702,133 | Kilpatrick | Feb. 15, 1955 |
| 2,865,846 | Degnen | Dec. 23, 1958 |